(12) United States Patent
Medina

(10) Patent No.: US 11,390,398 B2
(45) Date of Patent: Jul. 19, 2022

(54) MULTIPOINT SEPARATION SYSTEM

(71) Applicant: ARIANEGROUP SAS, Paris (FR)

(72) Inventor: Felipe Medina, Sartrouville (FR)

(73) Assignee: ARIANEGROUP SAS, Paris (FR)

( * ) Notice: Subject to any disclaimer, the term of this patent is extended or adjusted under 35 U.S.C. 154(b) by 242 days.

(21) Appl. No.: 16/767,892

(22) PCT Filed: Nov. 28, 2018

(86) PCT No.: PCT/FR2018/053019
§ 371 (c)(1),
(2) Date: May 28, 2020

(87) PCT Pub. No.: WO2019/106288
PCT Pub. Date: Jun. 6, 2019

(65) Prior Publication Data
US 2020/0369413 A1 Nov. 26, 2020

(30) Foreign Application Priority Data
Nov. 29, 2017 (FR) ...................................... 1761361

(51) Int. Cl.
*B64G 1/64* (2006.01)
*F42B 15/36* (2006.01)
*B64G 1/00* (2006.01)

(52) U.S. Cl.
CPC ............. *B64G 1/645* (2013.01); *B64G 1/002* (2013.01); *F42B 15/36* (2013.01)

(58) Field of Classification Search
CPC . B64G 1/645; B64G 1/64; F42B 15/36; F42B 15/38
See application file for complete search history.

(56) References Cited

U.S. PATENT DOCUMENTS

| 3,863,570 | A | 2/1975 | Bixby | |
|---|---|---|---|---|
| 5,218,165 | A | 6/1993 | Cornelius et al. | |
| 6,289,818 | B1 * | 9/2001 | Mueller | F42B 15/36 102/377 |
| 6,758,142 | B1 * | 7/2004 | Seaquist | F42B 15/36 102/377 |
| 8,082,848 | B2 * | 12/2011 | Hlavacek | F42B 12/60 102/377 |
| 8,091,481 | B1 * | 1/2012 | Floyd | F42B 15/36 102/377 |
| 8,807,485 | B2 * | 8/2014 | Aston | B64G 1/1085 244/172.4 |

FOREIGN PATENT DOCUMENTS

JP 2007083801 A 4/2007

OTHER PUBLICATIONS

International Search Report for International Patent Application No. PCT/FR2018/053019 dated Feb. 15, 2019.
Preliminary Search Report for French Patent Application No. 1761361 dated Jun. 13, 2018.

\* cited by examiner

*Primary Examiner* — Brian M O'Hara
(74) *Attorney, Agent, or Firm* — Pearne & Gordon LLP

(57) ABSTRACT

A system for separating composites of a space launch vehicle, comprising non-pyrotechnic separating modules distributed between the composites to be separated and a device for activating the separation modules, which can generate the simultaneous activation of all of the separating modules. The activation device consists of a source of compressed gas, the outlet of which is connected to each separation module.

3 Claims, 1 Drawing Sheet

MULTIPOINT SEPARATION SYSTEM

TECHNICAL FIELD

The invention relates to a system for separating composites of a space launch vehicle, intended to act simultaneously at several points.

PRIOR ART

Recent space launch vehicle development programmes have as a consequence a reduction in the number of pyrotechnic separation means.

Also, pyrotechnic separation systems make any intervention on the ground complex because they are not easy to dismantle, their access by an operator is moreover particularly difficult.

In addition, each of these pyrotechnic systems is associated with an associated control device, which implies the management of an important number of electrical signals in the launch vehicle.

The aim of the invention is to propose a system for separating composites of a space launch vehicle which is of simplified design compared to the prior art and for which the number of electrical signals, controlling the activation of the multiple separation points, is reduced.

DESCRIPTION OF THE INVENTION

The invention relates to a system for separating composites of a space launch vehicle comprising non-pyrotechnic separation modules distributed between the composites to separate and a device for activating the separation modules which is capable of causing the simultaneous activation of all the separation modules, characterised in that the activation device consists in a compressed gas source, the output of which is connected to each separation module.

Preferably, each separation module uses the energy of a flow of compressed gas to cause the separation of the composites.

Preferably, the output of the activation device is connected directly to each separation module by a pneumatic conduit.

Preferably, each separation module uses the energy of a pressurised fluid to cause the separation of the composites.

Preferably, the output of the activation device is connected to each separation module by a hydraulic conduit.

Preferably, a hydropneumatic converter is interposed between the activation device and the separation modules and each separation module is connected to the hydropneumatic converter by a hydraulic conduit.

Preferably, the activation device is mounted on a composite, near to the separation modules.

Preferably, the hydropneumatic converter is mounted on a composite, near to the separation modules.

BRIEF DESCRIPTION OF THE DRAWINGS

Other characteristics and advantages of the invention will become clear on reading the detailed description that follows, for the understanding of which reference should be made to the appended figures, among which.

DETAILED DESCRIPTION OF PARTICULAR EMBODIMENTS

Figure 1:
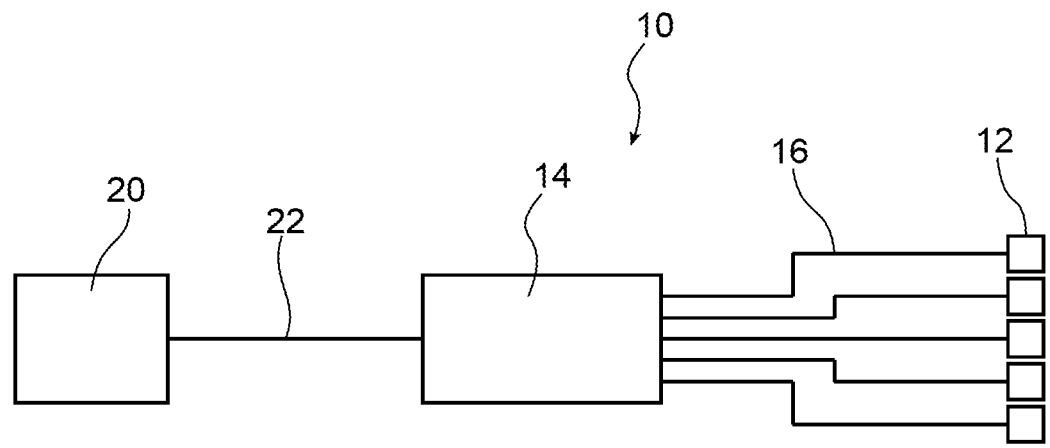
FIG. 1 is a schematic representation of a first embodiment of a system for separating composites of a space launch vehicle.

In the figures a separation system 10 for composites, also called stages, of a space launch vehicle is represented.

In the description that follows, reference will be made to a system for separating two adjacent composites. It will be understood that this description applies to a separation system 10 enabling the separation of more than two composites of the launch vehicle.

The two composites of the launch vehicle each comprise a cylindrical shell and the two shells are assembled with each other end to end in a detachable manner. In the course of a launch phase, the two composites separate, by the separation of the two shells in a controlled manner.

The separation system 10 comprises separation modules 12 which are produced to separate the composites, notably by ending the connection between the two shells.

The separation modules 12 are of the non-pyrotechnic type, that is to say that they do not use the explosion of a charge to cause the separation of the two shells. This makes it possible on the one hand to make any intervention on the ground safe, without risk for an operator.

Also, such separation modules 12 are generally reversible, which makes it possible to carry out tests of the separation on the ground without having to change them, or other components after each test.

To enable separation in good conditions, the separation modules 12 are distributed in a homogeneous manner along the connection between the two shells.

The separation system 10 also comprises an activation device 14 for activating the separation modules 12 which is capable of causing the simultaneous activation of all the separation modules 12.

This activation device 14 is connected to an electronic control device 20 forming part of the launch vehicle by a signal transmission line 22. The electronic control device 20 sends a single control signal to the activation device 14 to cause the activation of all the separation modules 12.

The assembly formed by the activation device 14 and the control device 20 makes it possible to use only one single electrical signal, on a single signal transmission line 22 in the entire launch vehicle, which thus makes it possible to reduce the complexity of the launch vehicle compared to an embodiment comprising a signal transmission line for each separation module.

The activation device 14 consists in a compressed gas source and its output is connected to each separation module 12.

According to a first embodiment, the activation device 14 consists in a pressurised gas tank of which the output, which is connected to the separation modules 12, is open when the electrical signal associated with the separation of the shells is sent by the electronic control device 20.

According to a second embodiment, the activation device 14 is a pyrotechnic device which produces gas following its ignition when the electrical signal associated with the separation of the shells is sent by the electronic control device 20.

According to a first embodiment represented in FIG. 1, the separation modules 12 are of pneumatic type, that is to say that each separation module 12 uses the energy of a flow of compressed gas to cause the separation of the composites and/or their shells.

As a non-limiting example, each separation module 12 corresponds to one of the different attachment points and thus to a separation point of a satellite from its dispenser.

In accordance with this embodiment, the activation device 14 is connected directly to each separation module 12 by a pneumatic conduit 16.

To enable simultaneous activation of all the separation modules 12, the pneumatic conduits 16 are preferably of same length.

Preferably, the activation device 14 is arranged inside one of the two composites, near to the separation modules 12. Thus, even if the separation system 10 comprises as many pneumatic conduits 16 as separation modules 12, the length of these pneumatic conduits 16 is limited compared to the distance between the separation modules 12 and the electronic control device.

Figure 2:
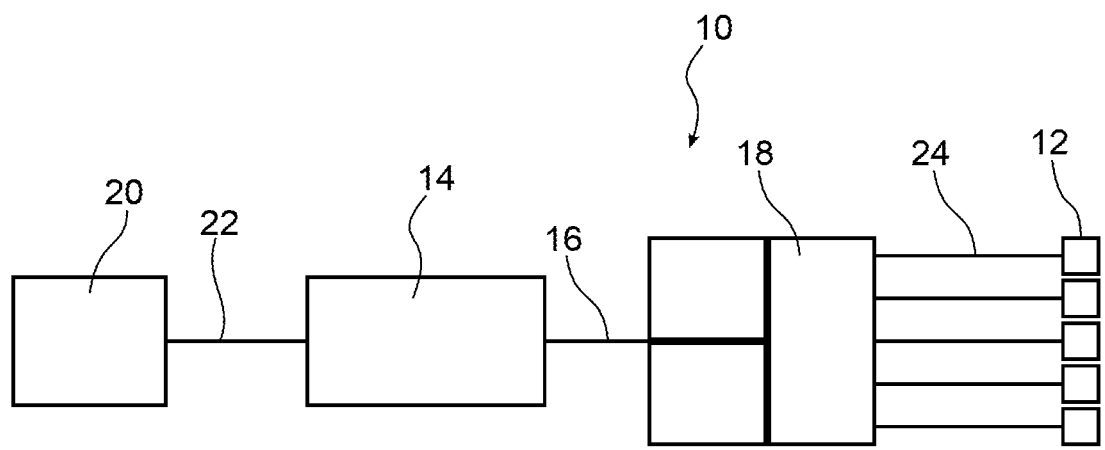
FIG. 2 is a schematic representation of a second embodiment of a system for separating composites of a space launch vehicle.

According to a second embodiment represented in FIG. 2, the separation modules 12 are of hydraulic type, that is to say that each separation module 12 uses the energy of a pressurised fluid to cause the separation of the composites and/or their shells.

In accordance with this second embodiment, the separation system 10 comprises a hydropneumatic converter 18 which is interposed between the activation device 14 and the separation modules 12.

This hydropneumatic converter 18 is actuated by the pneumatic energy of the pressurised gas produced by the activation device 14 and transforms this pneumatic energy into hydraulic energy supplying the separation modules 12.

Thus, the output of the activation device 14 is connected to the hydropneumatic converter 18 by a pneumatic conduit 16 and each separation module 12 is connected to the hydropneumatic converter 18 by an associated hydraulic conduit 24.

In a similar manner to the first embodiment, to enable simultaneous activation of all the separation modules 12, the hydraulic conduits 24 are preferably of same length.

Here also, preferably, the activation device 14 is arranged inside one of the two composites, near to the separation modules 12.

The hydropneumatic converter 18 is consequently arranged inside this same composite which bears the activation device, near to the separation modules 12.

According to an alternative embodiment, the activation device is arranged at a distance from the separation modules and it is only the hydropneumatic converter 18 which is arranged on a composite, near to the separation modules 12

Thus, even if the separation system 10 comprises as many hydraulic conduits 24 as separation modules 12, the length of these hydraulic conduits 24 is limited compared to the distance between the separation modules 12 and the electronic control device.

As has been said previously, the separation system 10 may be implemented for the separation of two launch vehicle composites, and also for the separation of more than two composites.

In the case where the separation system 10 is used for the separation of more than two composites, these composites may be separated simultaneously by connecting the activation device 14, and optionally the hydropneumatic converter 18, to the separation modules 12 which are associated with the shells of the composites having to be separated.

The components of the separation system 10 are of routine design, which makes it possible to limit the production costs thereof.

The invention claimed is:

1. A system for separating (10) composites of a space launch vehicle comprising non-pyrotechnic separation modules (12) distributed between the composites to separate and an activation device (14) for activating the separation modules (12) which is capable of causing simultaneous activation of all the separation modules (12) and comprising a compressed gas source, the output of which is connected to each separation module (12), wherein:
   each separation module (12) is configured to use energy of a pressurised fluid from the compressed gas source to cause the separation of the composites, and
   a hydropneumatic converter (18) is interposed between the activation device (14) and the separation modules (12) and each separation module (12) is connected to the hydropneumatic converter by a hydraulic conduit (24).

2. The separation system (10) according to claim 1, wherein the activation device (14) is mounted on a composite of the composites, near to the separation modules (12).

3. The separation system (10) according to claim 1, wherein the hydropneumatic converter (18) is mounted on a composite of the composites, near to the separation modules (12).

* * * * *